United States Patent [19]

Marheine

[11] 3,965,304
[45] June 22, 1976

[54] INTERCEPT ARRANGEMENT FOR KEY TELEPHONE SYSTEMS

[75] Inventor: Edward A. Marheine, Brookfield, Wis.

[73] Assignee: GTE Automatic Electric Laboratories Incorporated, Northlake, Ill.

[22] Filed: Dec. 10, 1974

[21] Appl. No.: 531,280

[52] U.S. Cl. .............................. 179/18 B; 179/6 R
[51] Int. Cl.² ........................................ H04M 3/42
[58] Field of Search ............. 179/6 R, 6 TA, 18 BE, 179/27 FG, 27 D

[56] References Cited
UNITED STATES PATENTS

| | | | |
|---|---|---|---|
| 3,090,835 | 5/1963 | Kroning et al. | 179/27 FG X |
| 3,515,813 | 6/1970 | Cleary | 179/18 BE X |
| 3,780,227 | 12/1973 | Pirnie et al. | 179/27 D X |

*Primary Examiner*—William C. Cooper
*Attorney, Agent, or Firm*—Robert J. Black

[57] ABSTRACT

An intercept arrangement by which on calls incoming to a key telephone system the calling party is provided with one and only one complete recorded message within a relatively short time so that the number of abondoned calls caused by excessive delays in answering is reduced. The arrangement includes ring counting, transfer and intercept trunk circuits on a one-per-line basis and a common intercept recorder. The trunk circuit has a monitor feature to provide a form of calling party release for all offices, and a standby-music facility which becomes effective after the transmission of the message.

7 Claims, 4 Drawing Figures

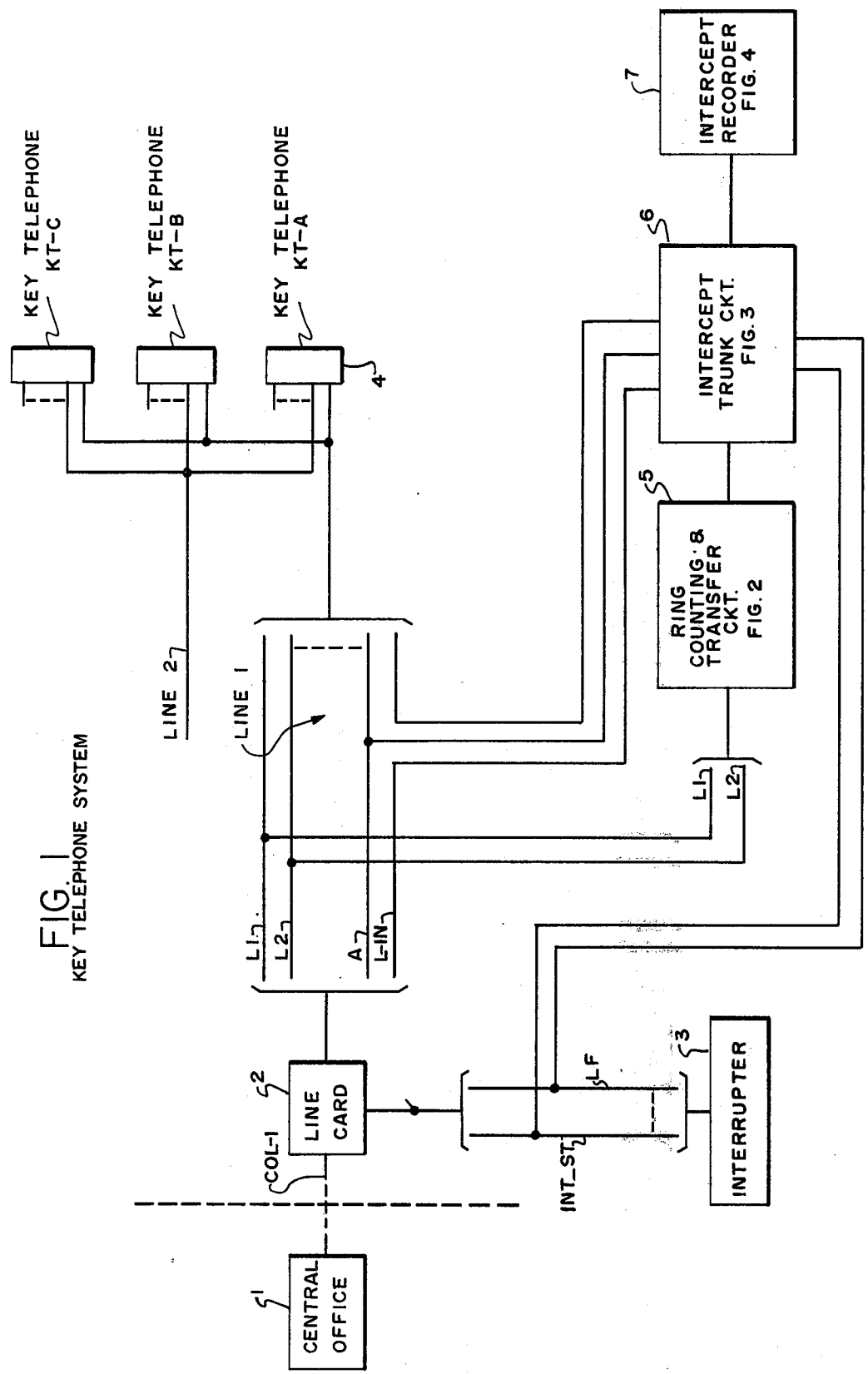

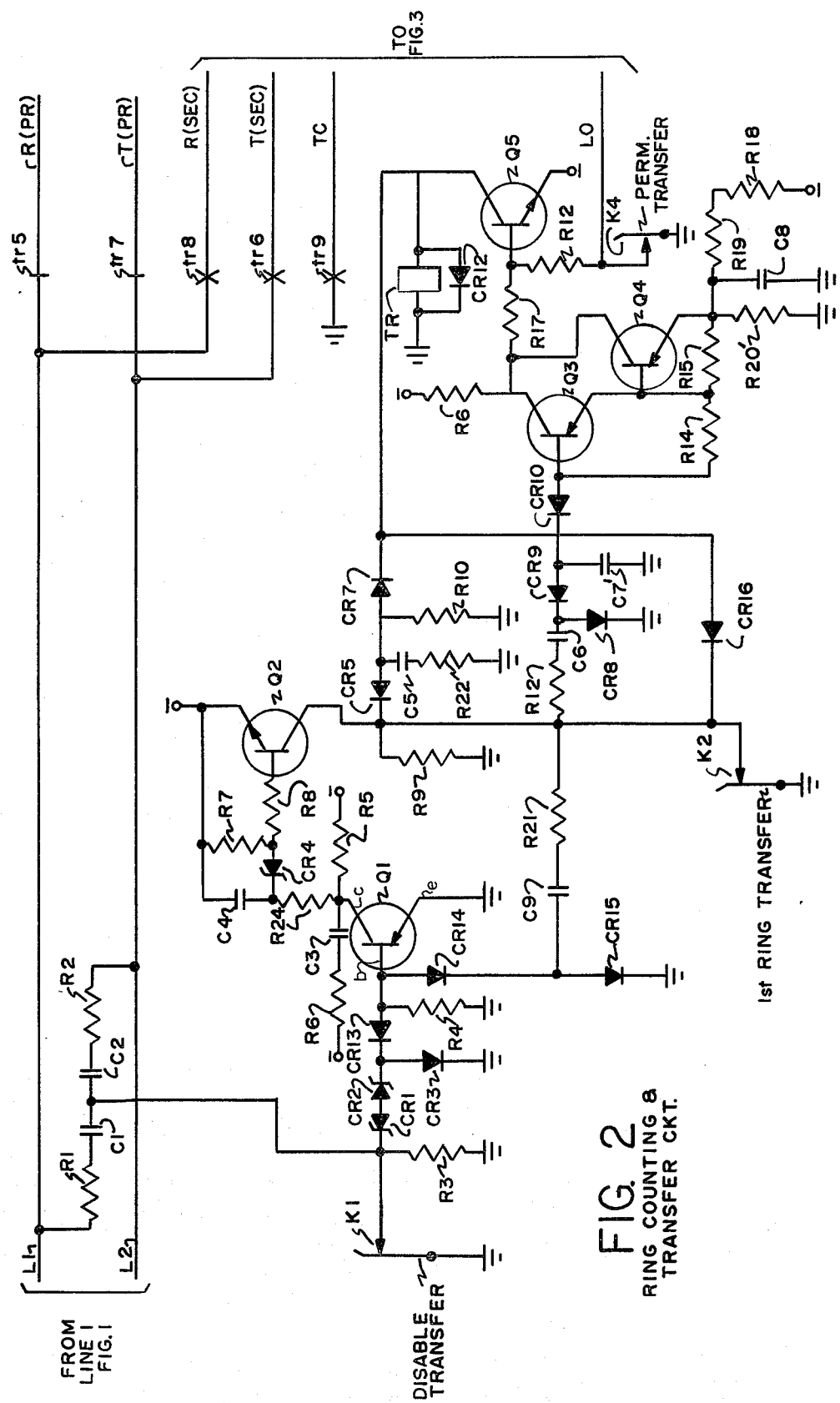
FIG. 2 RING COUNTING & TRANSFER CKT.

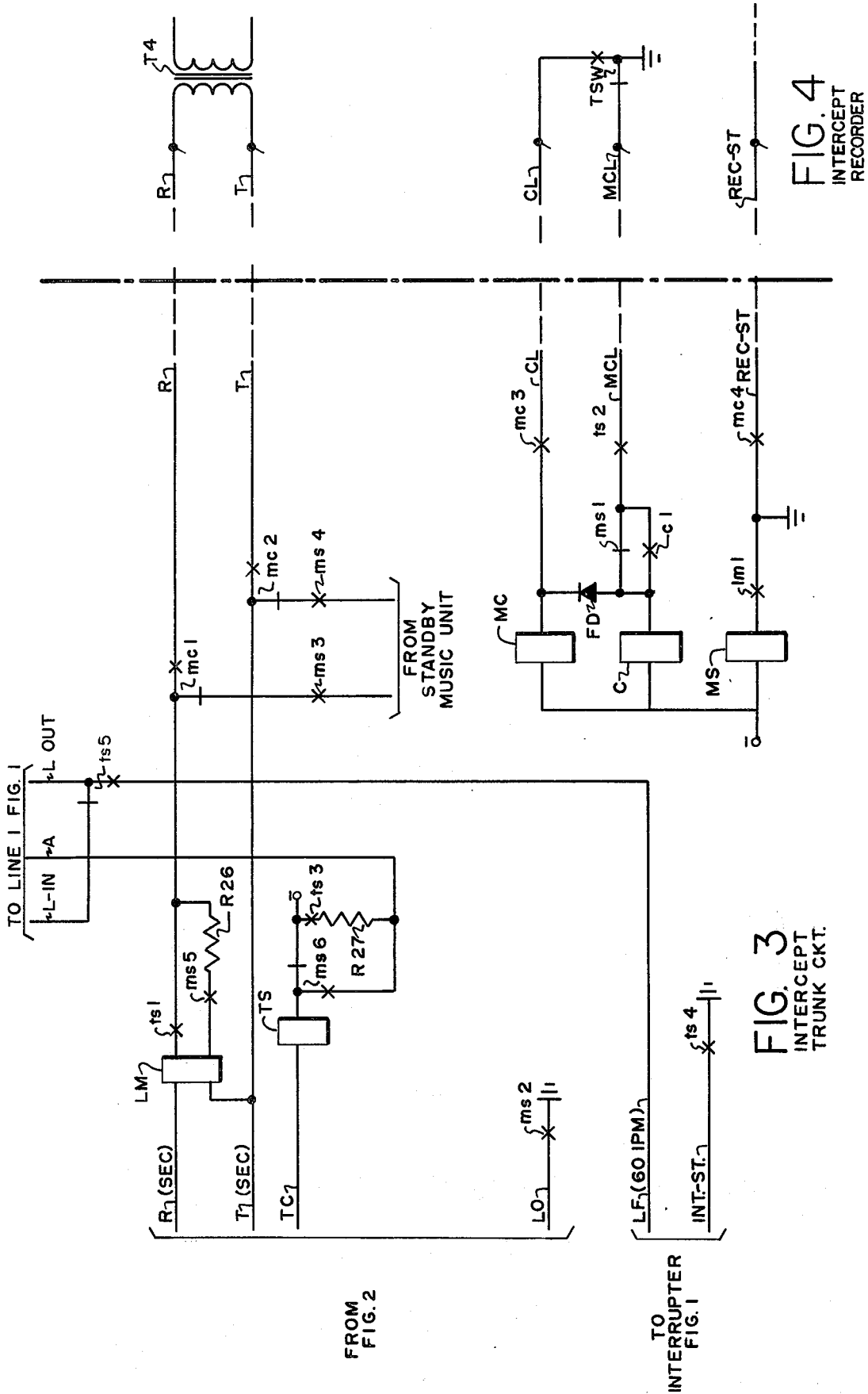

INTERCEPT ARRANGEMENT FOR KEY TELEPHONE SYSTEMS

BACKGROUND OF THE INVENTION

The invention relates to key telephone systems and, more particularly, to call intercept arrangements for use in such systems.

In key telephone systems it is common practice to use one key telephone station as an attendant's station for handling some, or all, of the outside lines--central office lines, PABX lines or the like--that have an appearance on his or her station. This involves especially the answering of calls incoming over the lines and, if the call is destined for another key telephone station, the transfer of the incoming call, say by means of an intercom facility, to such other station. In many instances the demand on the attendant's time may become so great that there is a danger of calls stacking up and remaining unanswered.

OBJECTS AND SUMMARY OF THE INVENTION

It is one object of the invention to provide an arrangement by which, in the instances referred to above, a calling party can be provided with a recorded answering message in a relatively short time, thereby to reduce the number of abandoned calls caused by excessive delays in answering.

It is another object of the invention to provide an intercept trunk circuit for use in key telephone systems, with the aid of which it is possible to provide such an answering service for the entire group of lines, or the entire key telephone system, by means of a single intercept recorder, e.g. of the general type commercially available for intercept service in central offices.

It is yet another object of the invention to provide an intercept trunk circuit by means of which, irrespective of the use of a single intercept recorder of the general type just mentioned, the calling party is assured of the receipt of one, and only one, complete answering message.

It is a further object of the invention to provide an intercept arrangement for key telephone systems which has a monitoring function insuring a form of calling party control for all offices, including those of the last party release type, to which the distant end of any of the outside lines may be connected.

The foregoing and other objects are met by the invention, briefly, by the provision of a ring counting, transfer and intercept trunk circuit which is individually connected to a corresponding outside line and is also connected to the common intercept recorder; the circuit has first switching means which are effective after the receipt of a predetermined number of rings over this individual line for initiating the extension of this line to the common intercept recorder; and it has second switching means which is controlled by the first switching means and which in turn controls the above-mentioned circuit so that one, and only one, complete message is returned to the outside line by the intercept recorder even though the intercept recorder may be kept in use by calls incoming from another, or others, of these outside lines.

The invention, in another aspect thereof, consists in an overall intercept arrangement for key telephone systems with a plurality of outside lines, which provide for a plurality of ring counting, transfer and intercept trunk circuits of the aforementioned general kind, each individually connected to an individual one of the outside lines, and an intercept recorder connected to these circuits in common.

BRIEF DESCRIPTION OF THE DRAWINGS

A preferred embodiment of the invention will now be described with reference to the accompanying drawings, in which:

FIG. 1 is a block diagram of a key telephone system incorporating the intercepting arrangement according to the invention;

FIGS. 2 and 3 taken together show a detailed circuit diagram of the ring counting, transfer and intercept trunk circuit according to the present invention, with FIG. 2 illustrating the ring counting and transfer portion and FIG. 3 the intercept trunk portion of this circuit; and FIG. 4 diagramatically shows the intercept recorder circuit as far as required to facilitate a full understanding of the invention.

DESCRIPTION OF THE OVERALL SYSTEM

FIG. 1 shows on the right hand side of the dot-dash line, the key telephone system in block diagram form, and on the left hand side a central office 1 which is connected to a corresponding line circuit or "line card" 2 of the key telephone system by a 2-wire central office line COL-1. The central office may be of any conventional type; in particular it includes switching equipment, for example, in the form of a connector (not shown), from which, in response to the setting up of a call by a calling party, ringing current is projected over line COL-1. The central office may be arranged for any type of release mode, including calling party release or last party release. The line card may be of the type shown and described in the article "Compact Key Telephone System," *Automatic Electric Technical Journal*, Vol. 9, No. 6, of April 1965, pages 218 to 226; the article addresses itself to the 10A2 key telephone system.

Associated with line card 2, and also with other such line cards (not shown) respectively associated with other outside lines, is an interrupter 3 which, upon the receipt of an incoming call, is started over interrupter start conductor INT-ST and is arranged to supply a number of signaling outputs including the 60 IPM lamp flashing signal which is transmitted over conductor LF; in addition provisions are made for an audible signal to be sounded.

FIG. 1 also shows, by way of example, three key telephone stations: KT-A, KT-B, KT-C, at all of which line No. 1, connected to the output side (right hand side in FIG. 1) of line card 2, has an appearance. The figure also indicates that other lines, including line No. 2 which is assumed to be connected to another corresponding one of the line cards, likewise have an appearance on the three key telephones shown. These key telephones may also be equipped with an intercom facility, not particularly shown, over which outside calls may be transferred from one to another key telephone station. For each of the outside lines such as No. 1 and No. 2, a separate line or pickup key (not shown) and a separate signal lamp (not shown) are provided at each key telephone station in the usual manner. It is assumed that key telephone KT-A, designated 4 in FIG. 1, is the attendant's station at which incoming outside line calls are extended to the other key telephones, such as by use of the aforementioned intercom facility. The key telephones may be, for example, of the Type 186 shown and described in the paper "Types 186 and 187 Key Telephones," *Automatic Electric Technical Journal*, Vol. 11, No. 2, of April 1968, pages 34 to 38.

The right hand bottom portion of FIG. 1 diagramatically illustrates the units of particular pertinence to the present invention, namely, the ring counting and transfer circuit 5 which is shown in detail in FIG. 2; the intercept trunk circuit 6, the details of which are illustrated in FIG. 3, and the intercept recorder 7, the pertinent portion of which is shown in FIG. 4. As will be seen from FIG. 1, intercept recorder 7 is provided in common to the various lines, whereas ring counting and transfer circuit 5 and intercept trunk circuit 6 are individually associated with line No. 1. Circuits 5 and 6 may be mounted on a single equipment unit, for example, a printed circuit card, and there may be as many of these units as there are lines.

It will be also noted from FIG. 1 that the ring counting and transfer circuit is connected in parallel to line or "talking" conductors L1, L2 of line No. 1. Similarly conductor A terminating in intercept trunk circuit 6 is connected in parallel to the A or pickup conductor of line No. 1. On the other hand, the lamp conductor L of line No. 1 is subdivided into an L-IN conductor and an L-OUT conductor which separately terminate in intercept trunk circuit 6. This circuit 6 is also connected to the INT-ST and LF conductors which interconnect the line cards and interrupter 3.

Intercept recorder 7 is assumed to be of the well-known type used for call intercept service in central offices. An example of such a recorder is intercept recorder INT-2B-AE as manufactured and marketed by GTE Automatic Electric Incorporated.

DETAILED DESCRIPTION

The operation of the intercept arrangement according to the preferred embodiment of the invention will now be described in greater detail with reference to FIGS. 2, 3, and 4 of the drawings.

Reference is made at this point to U.S. Pat. No. 3,515,813 on a "Telephone Ringing and Transfer Device," which issued to Cleary et al. on June 2, 1970. The ringing, counting and transfer circuit illustrated in FIG. 2 of the present invention in most respects is similar to the circuit shown in the Cleary et al. patent and the last-mentioned patent should accordingly be considered as incorporated herein for purposes of disclosure. FIG. 2, however, reflects modifications with respect to the circuit of the Cleary et al. patent primarily in the following particulars:

1. While in the Cleary et al. patent the transfer contacts of relay TR serve to transfer the line conductors from a primary telephone A to a secondary telephone B, in the case of the invention the break or primary side of these contacts ordinarily is not used and the make or secondary side of these contacts is connected to the intercept trunk circuit, FIG. 3.

2. In the case of the invention, Cleary et al's hold relay H and the associated contacts TR1, TR2, TR3, TR4 of the transfer relay have been eliminated and in their place a locking conductor L originating in FIG. 3, has been connected to the lower end of resistor R12.

3. Along with contact H1, the diode CR6 and the connection including these components and terminating at the junction between resistors R18 and R19 have been omitted.

4. The "5th ring trans." key, K3, and the associated capacitor C10 have been eliminated because they are not required in connection with the present invention.

5. The value of resistor R20 (designated R20' in FIG. 2) has been changed from 500 ohms to 432 ohms, and that of capacitor C7 (designated C7' in FIG. 2) has been changed from 2 microfarads to 2.47 microfarads.

As described in the Cleary et al. patent, the principal function of the ring counting and transfer circuit is to bring about a switching operation—in the instance case, extension of the line conductors L1, L2, to the intercept trunk circuit, FIG. 3—when an incoming call is not answered within a predetermined number of rings. Use of an electronic ringing signal detector including balanced network R1, C1, C2, R2 and Zener diodes CR2, CR13, makes this possible without drawing an appreciable amount of energy from the line ringing signal, without affecting the speech level, and in a manner providing immunity from noise.

The components associated with transistors Q1 and Q2 then form a DC pulse lasting for practically the entire duration of the ringing interval, and the components associated with a first capacitor C6 and a second capacitor C7 (C7' in FIG. 2) serve to count the ringing signals. More particularly, this is accomplished by charging capacitor C6 in response to each ringing period and, at the end of each ringing interval, transferring the charge of this capacitor to the larger capacitor C7 (C7'). The last-mentioned capacitor, upon reaching a predetermined charge level, with the aid of transistors Q3, Q4 triggers a relay driver amplifier Q5 to operate a transfer or switching relay TR. When resistor Q5 is turned on, it also provides a collector path through diode CR11 and resistor R13 to the cathode of diode CR10. As a result, the negative voltage at the collector of transistor Q5 gives rise to a current flow to the base of transistor Q3, maintaining this transistor in a fully conductive state. There is also a timeout circuit consisting of components CR5, C5, R22 and R10, the last-mentioned circuit becoming effective when ringing pulses are no longer received.

Incoming Call

The operation of the present intercept arrangement on receipt of an incoming call is as follows: When diode CR10 of the ringing counter and transfer circuit, FIG. 2, becomes conductive under the control of the counting circuit R12, C6, CR9, C7' after a predetermined number of ringing pulses, relay TR, FIG. 2, operates due to transistor Q5 turning on under the control of transistors Q3 and Q4, and the circuit is maintained in this condition by virtue of the aforementioned locking circuit which extends over the emitter-base paths of transistors Q3 and Q4 and the collector-emitter path of Q5 in series. Relay TR, in operating, at its contacts tr5, tr7 and tr8, tr9, transfers the line conductors L1, L2 from the "primary" line conductors R(PR), T(PR)—which, as mentioned, ordinarily are not used in connection with the present invention—to secondary line conductors R(SEC), T(SEC) and thence to an incomplete loop circuit including line monitor relay LM, FIG. 3; and at contact tr9 operates relay TS over the break side of contact ms6 to battery. Contact ms6 is a make-before-break contact as indicated by the asterisk. Relay TS, in operating, at ts3 prepares a circuit, including resistor 27, to conductor A which is multiple-connected to the line or pickup keys (not shown) of the key telephones such as KT-A, KT-B, KT-C, FIG. 1, on which line No. 1 has an appearance; at ts1 prepares another point in the circuit of relay LM; at $ts5$ transfers the L-OUT conductor leading to the associated line or pickup lamps (not shown) of the key telephones, from the L-IN conductor coming from line card 2, FIG. 1, to the 60IPM lamp-flash conductor LF of interrupter 3, FIG. 1; at $ts4$ grounds the interrupter start conductor INT-ST, thereby to start interrupter 3; and at $ts2$ closes a point in the operating circuits of relays MC and C.

1. Intercept recorder not in use

Assuming that the intercept recorder, FIG. 4, is not in use and, hence, tape switch TSW of this recorder at normal at this time, then relays MC and C are now operated via the break of tape switch TSW, conductor MCL, contact $ts2$ of relay TS and contact $ms1$ of relay MS, with the circuit of relay MC additionally including diode FD. Relay C, in operating, at contact $c1$ closes a holding circuit for itself and for relay MC to conductor MCL independently of break contact $ms1$ of relay MS. Relay MC, in operating, at $mc3$ prepares a holding circuit for itself to the make contact of tape switch TSW via conductor CL; at $mc4$ grounds start conductor REC-ST to the intercept recorder,, FIG. 4; and on the make sides of contacts $mc1$, $mc2$ completes the called loop from the output winding of output transformer T4, FIG. 4, of the intercept recorder via the upper winding of line monitor relay LM, by way of line card 2 and central office line COL-1, FIG. 1, to the ringtrip relay of the connector, now shown, in office 1. This causes the ring to be tripped so that, due to the cessation of ringing, timeout is started both in line card 2 and in the transfer circuit, FIG. 2; and it causes line COL-1 to be connected, through the back-bridge relay of the connector, to battery and ground in the usual manner. Relay MS, in operating, at its make contact of $ms6$ transfers the circuit of relay TS to a path including this make of $ms6$, resistor R27 and contact $ts3$ in series; at $ms5$ prepares a holding circuit for relay LM independently of the intercept recorder loop, this holding circuit extending over relatively high resistance R26, $ms5$ and the lower, high-resistance winding of relay LM; at $ms1$ opens a point in the operating circuits of relays MC and C; at $ms3$, $ms4$ prepares a standby music circuit; and at $ms2$ closes ground via conductor L0 and resistor R12, FIG. 2, to the base of transistor Q5, thereby holding this transistor turned on and relay TR operated. As a result the transfer circuit, FIG. 2, is maintained in transferred condition independently of the operation of timeout circuit CR5, C5, R22, R10, FIG. 2, and relays TS, C and MC, FIG. 3, also remain operated. Thus, although signaling from line card 2 is stopped after timeout of the line card, the L-OUT conductor leading to the lamps in the key telephones remains connected at the make side of $ts5$ to the LF (60IPM) conductor of interrupter 3, FIG. 1, thereby insuring continued signaling of the key telephones under the control of the intercept trunk circuit.

After the tape of the intercept recorder, FIG. 4., has come up to speed, transmission of the message recorded on the tape is started and tape switch TSW which in intercept recorder INT-2B-AE, for example, is controlled by a short slotted section of the endless tape, operates, thereby to keep the recorder by the action of other tape switch contacts (not shown) running until the slotted section of the tape is again reached at the end of the reproduction cycle. Tape switch TSW, in operating, on the break side of its contact shown in FIG. 4 opens the operating circuit, extending over conductor MCL, of relays MC and C, allowing relay C to release; however, relay MC remains operated over the make contact of the tape switch and the C conductor.

At the completion of the automatic answering message tape switch TSW, in restoring to normal, transfers ground from the CL conductor back to conductor MCL. Relay MC now restores, returning all of its contacts to normal. Due to contact $ms1$ being open, MC is prevented from reoperating over the MCL conductor and this insures that not more than one message is delivered to the calling party even though the recorder may be kept in operating condition by a call on another line, say line No. 2, FIG. 1. After the release of relay MC, relay LM is held operated over the central office loop through both windings of LM, resistor R26 and operated contact $ms5$ of relay MS in series. The total loop resistance is now insufficient to hold the back-bridge relay in the connector operated. This permits the connector to restore when the calling party hangs up, even in the case that the central office is arranged for last party release.

Relay MC, in restoring, at the break contacts of $mc1$, $mc2$ also completes a standby music circuit via closed contacts, $ms3$, $ms4$ of relay MS. In this fashion the calling party automatically receives standby music from a standby music unit, a separate recorder not particularly shown, after the announcement message has been delivered.

2. Intercept recorder in use

It was assumed above that when relays TR and TS operated at the time the ringing, counting and transfer circuit, FIG. 2, became effective, the intercept recorder and hence its tape switch TSW, FIG. 4, was at normal. Assuming on the other hand that at the time of operation of relay TR and TS the intercept recorder is in operation in another call, that is in a call received over another line such as line No. 2, FIG. 1, then the tape switch is already operated and hence relay MC is kept from operating. This prevents the calling party from being switched through to the intercept recorder in the middle of a message. Moreover, since the called loop is not closed at this time, no answering supervision is returned to the connector and the transmission of ringing current continues. As a consequence, the audible signal continues to be operated under the control of line card 2, FIG. 1, and the lamps at the key telephones continue to display a 60 IPM flashing signal.

Assuming the calling party has not abandoned the call at the time the tape switch is restored upon the intercept recorder returning to normal condition in the other call, relays MC and C operate and the circuit then functions as described above. It may be mentioned at this point that the intercept recorder of the type considered for use in connection with the present invention, has a message cycle of only approximately 10 seconds, corresponding to about two 5-second ringing periods. Thus, with the ring counting and transfer circuit adjusted for operation after one or four rings, the overall waiting time for the calling subscriber until start of the message is a maximum of only about three or six ringing periods, even in the worst case where the recorder at the time of switchthrough of the transfer circuit has just been taken into use by another call.

Release of Circuit upon Answering

When, after the transfer circuit has become effective and at any time after the intercept recorder has completed the loop circuit back to the connector, as described above, the central office call is answered at one of the key telephone stations, such as KT-A, FIG. 1, by operation of the pickup key associated with line No. 1 and lifting of the handset, ground is returned over the A conductor in the well-known manner. As a consequence, line card 2, FIG. 1, is placed in answering condition and, in addition, the ground on conductor A places a shunt across the winding of relay TS, thereby causing this relay to restore. Relay TS, in releasing, at ts1 opens the loop circuit extending over the windings of relay LM, to the calling party so tht relays LM and MS also restore. Relay MS, in releasing, at its contact ms2, opens the holding circuit for transistor Q5 so that this transistor becomes nonconductive, thus bringing about the release of relay TR which thereby disconnects the intercept trunk circuit and the intercept recorder from line No. 1, FIG. 1. The trunk circuit is now again in normal condition.

If relay MC is still operated at the time of the operation of the pickup key, that is if the pickup key was thrown during the delivery of the message by the intercept recorder, then relay MC remains operated and hence ground remains connected to start conductor REC-ST until tape switch TSW, upon completion of the message, is restored to normal, permitting MC to release. It will be noted, however, that because of the above-mentioned opening of the loop circuit by relay TS, the portion of the message remaining after the operation of the pickup key is no longer heard by the calling party—or, for that matter, the party operating the pickup key—so that the conversation between the two parties is not disturbed by this residual part of the message.

If the call is answered at one of the key telephone stations before the ringing, counting and transfer circuit has become effective, that is prior to the operation of its TR relay, the cessation of the ringing current causes the transfer circuit to restore to normal condition at the end of its timeout delay, as described herein below for the case of the abandonment of the call by the calling party. If, finally, the call is answered from a key telephone station after the transfer circuit has become effective, but before completion of the loop circuit by the intercept recorder, that is prior to operation of relays LM and MS, then the ground returned by the pickup key over the A conductor shunts the winding of relay TS, insuring release of this relay; relay TR also releases under the control of the timeout circuit as described above.

Abandonment of Call by Calling Party

If the central office subscriber abandons the call while the circuit, FIG. 2, is in transferred condition and after the ring has been tripped by the intercept recorder but prior to pickup, then, because of the high resistance of the holding circuit extending over contact ms5, FIG. 3, the central office connector circuit will fully restore, in turn permitting relays LM and MS to release. Relay TR, FIG. 2, releases due to its locking circuit being opened at contact ms2, in turn permitting relay TS to restore in FIG. 3. The intercept trunk circuit accordingly returns to normal, except that relay MC will remain operated until tape switch TSW is restored to normal upon completion of the reproduction cycle of the intercept recorder. While MC is operated, ground is maintained on start lead REC-ST to insure that the recorder returns to normal condition.

If the call is abandoned before the ringing, counting, and transfer circuit, FIG. 2, has become effective to bring about the operation of relay TR, the removal of the ringing voltage from the incoming line conductors L1, L2 stops the intermittent actuation of transistors Q1 and Q2 and hence capacitor C5 of the timeout circuit, in FIG. 2, is permitted to discharge sufficiently via resistor R11 to allow capacitor C7' to discharge via diode CR7; the circuit is thus in condition to handle the next incoming call.

Assuming finally that the call is abandoned after the transfer circuit has become effective, but before the intercept recorder has completed the called-side loop and thus tripped the ring, then the timeout circuit will operate substantially as in the case just described. The discharge of capacitor C5 removes the negative bias from transistor Q3 so that Q4 and Q5 also become nonconductive and relay TR releases. Relay TS, FIG. 4, is now also permitted to release and, consequently, the intercept trunk circuit is likewise permitted to return to normal condition, followed by the release of the intercept recorder, FIG. 4.

First Ring Transfer

If it is desired that the transfer circuit, FIG. 2, become effective already after the first ring, then the first ring transfer key K2 is operated and accordingly ground removed from the junction of resistor R11 and diode CR16. Therefore, upon the operation of transistor Q2 in response to an incoming call, transistor Q3 is immediately forward biased via resistor R11 and diode CR16 so that the counting circuit including capacitors C6 and C7' is bypassed. As a result, relay TR operates upon receipt of the first ringing pulse.

Disabling of Transfer

If no transfer is desired, the upper terminal of resistor R3, FIG. 2, is grounded by the operation of disable transfer key K1. This prevents the circuit from detecting the ringing voltage and thus keeps it from transferring the call to the intercept trunk circuit. The ringing voltage, otherwise appearing at the junction of capacitor C1 and C2 in this case is short-circuited to ground by way of key K1.

It should be understood that the foregoing description is not meant to limit the invention to the disclosed embodiment.

What I claim is:

1. For use in a key telephone system having a plurality of outside lines and having an intercept recorder provided in common for said outside lines;
   a ring counting, transfer and intercept trunk circuit having terminations for individually connecting said circuit to a corresponding one of said outside lines and other terminations for connecting said circuit to said common intercept recorder; having first switching means effective after the receipt of a predetermined number of rings over said individual outside line for initiating extension of said line to said common intercept recorder; and second switching means controlled by said first switching means and in turn controlling said circuit so that one, and only one, complete message is returned to said outside line by said intercept recorder regardless of whether said intercept recorder is kept in use by calls incoming from another, or others, of said outside lines said second switching means comprising switchthrough means controlled by said intercept recorder only when said recorder is not transmitting a message, for completing an answering loop from the output of said intercept recorder to said outside line, preparatory to the return of said message over said answering loop; and said ring counting, transfer and intercept trunk circuit further including a locking connection causing said first switching means to be held operated under the control of said switchthrough means; and switching elements controlled by said first switching means for closing an independent signalling circuit to key telephones included in said key telephone system; whereby signalling of said key telephone is continued irrespective of the termination of ringing current transmission over said outside line upon completion of said answering loop.

2. A ring counting, transfer and intercept trunk circuit for use in a key telephone system as claimed in claim 1 wherein said switchthrough means upon operation completes a locking circuit for itself which is disabled upon said intercept recorder returning to its normal position, whereby the return of more than one complete message over said outside line is prevented.

3. A ring counting, transfer and intercept trunk circuit for use in a key telephone system as claimed in claim 1, wherein said answering loop includes supervisory means in said circuit operated in said answering loop for placing a holding loop comprising said supervisory means across said outside line.

4. A ring counting, transfer and intercept trunk circuit for use in a key telephone system as claimed in claim 1 wherein said circuit includes a pickup terminal and circuit connections extending between said terminal and said first switching means such that said first means is shunted by a potential received by said terminal upon pickup of the call at one of the telephones of said key telephone system, said first switching means upon release causing said circuit to restore.

5. A ring counting, transfer and intercept trunk circuit for use in a key telephone system as claimed in claim 2 wherein said circuit has additional terminations for the connections to said outside line of a standby-music recording, said connections being made effective in response to said switchthrough means releasing after completion of said message.

6. In a key telephone system, a call intercept arrangement for a plurality of outside lines, said arrangement comprising:
a plurality of ring counting, transfer and intercept trunk circuits, each individually connected to an individual one of said lines, and a common intercept recorder connected to said circuits: each said ring counting, transfer and intercept trunk circuit having apparatus effective after the receipt of a number of rings over the corresponding outside line for extending said line to said common intercept recorder and causing said recorder to return one and only one complete message to said outside line regardless of whether said intercept recorder is kept in use by calls incoming from another, or other, of said outside lines.

7. In a key telephone system, a call intercept arrangement for a plurality of central office lines, said arrangement comprising a plurality of ring counting, transfer and intercept trunk circuits, each individually connected to a corresponding one of said lines, and a common intercept recorder connected to said circuits; each said ring counting, transfer and intercept trunk circuit having apparatus effective after the receipt of a number of rings over the corresponding central office line for extending said line to said common intercept recorder and causing said recorder to return a message to said central office line; said apparatus including switchthrough means controlled by said intercept recorder when said recorder is not transmitting a message, for completing an answering loop for the output of said intercept recorder to said central office line, preparatory to the return of said message over said answering loop; said answering loop including supervisory means in said circuit operated in said loop for placing a holding loop comprising said answering means across said central office line; and said holding loop having a resistance high enough to permit the central office switching equipment to restore in response to termination of a call by a calling party even though said switching equipment is arranged for last-party release.

* * * * *

UNITED STATES PATENT AND TRADEMARK OFFICE
CERTIFICATE OF CORRECTION

PATENT NO. : 3,965,304
DATED : JUNE 22, 1976
INVENTOR(S) : EDWARD A. MARHEINE

It is certified that error appears in the above–identified patent and that said Letters Patent are hereby corrected as shown below:

Column 10, line 31, delete "for" and add -- from --

Signed and Sealed this

Thirty-first Day of August 1976

[SEAL]

Attest:

RUTH C. MASON
*Attesting Officer*

C. MARSHALL DANN
*Commissioner of Patents and Trademarks*